July 19, 1932.  O. S. HERSHEY  1,867,828
AUTOMOBILE LOCK
Filed April 13, 1922  3 Sheets-Sheet 1
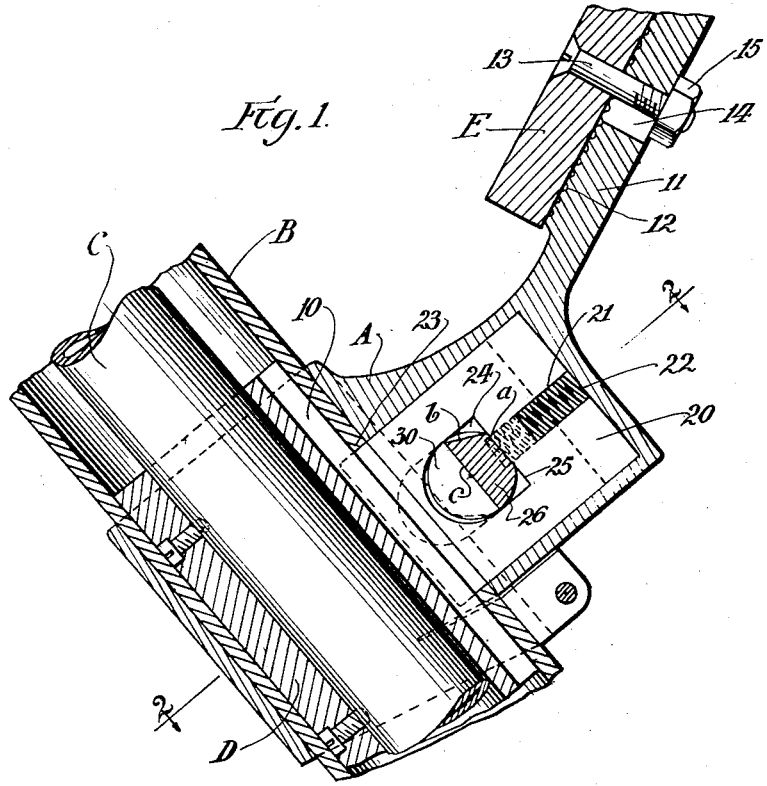
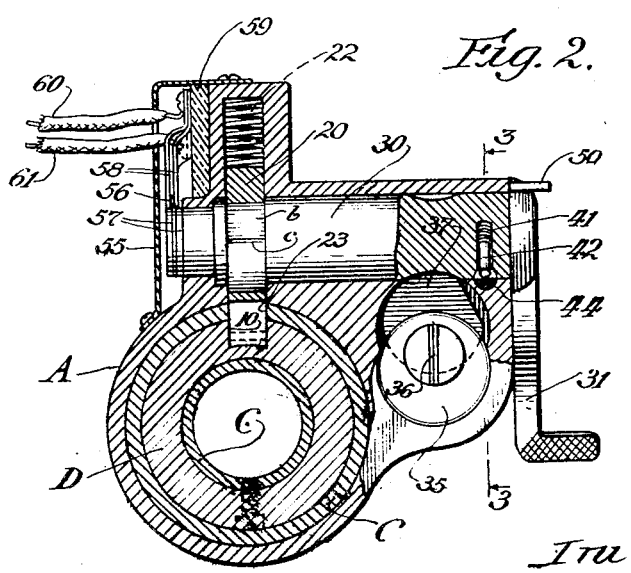
Inventor
Orville S. Hershey

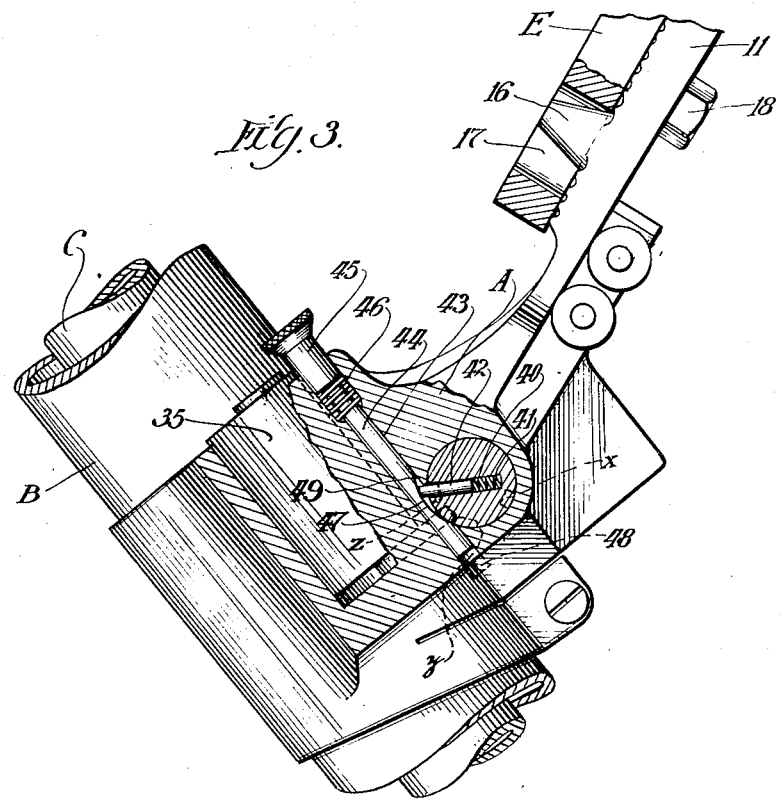
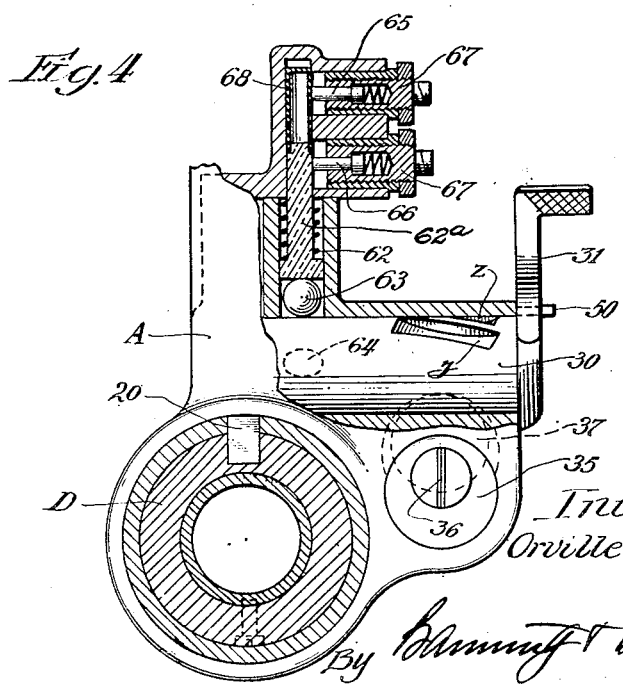

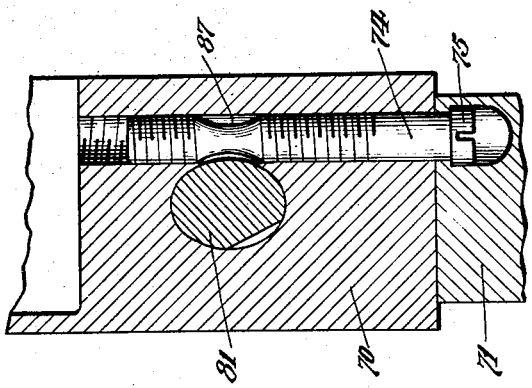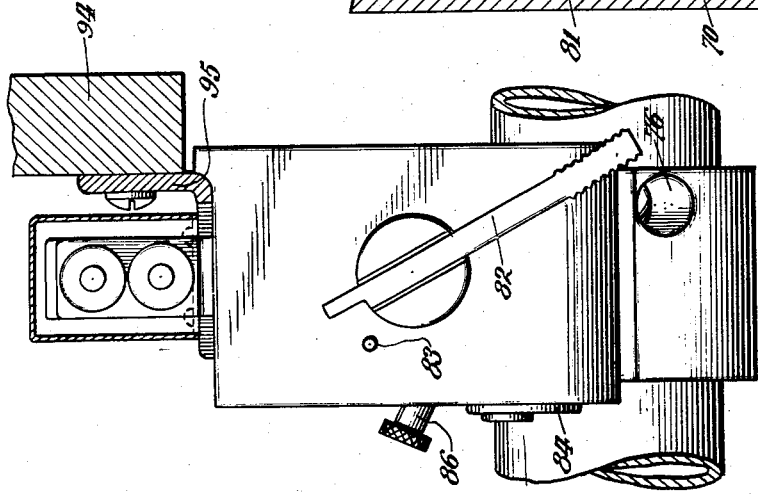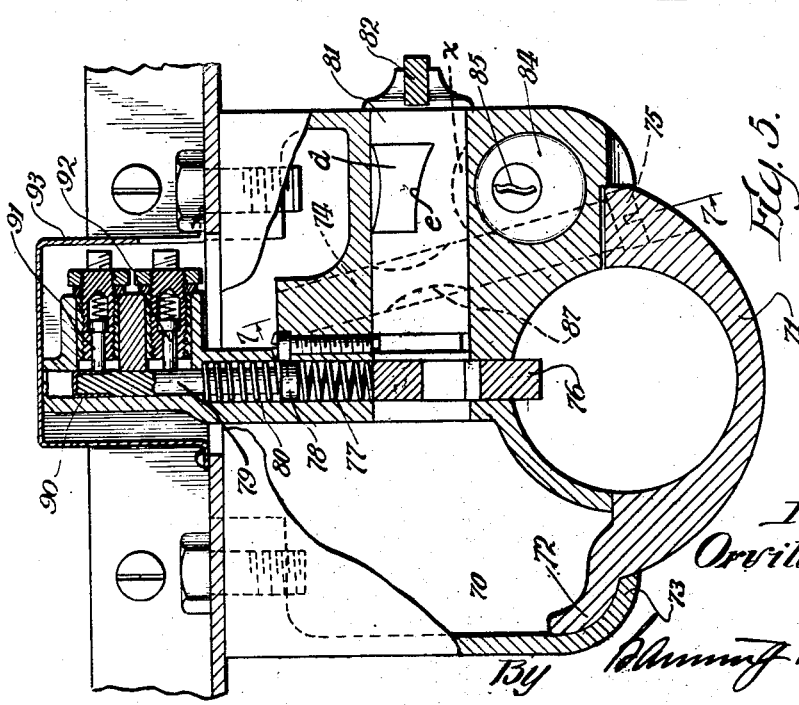

Patented July 19, 1932

1,867,828

UNITED STATES PATENT OFFICE

ORVILLE S. HERSHEY, OF SAGINAW, MICHIGAN, ASSIGNOR, BY MESNE ASSIGNMENTS, TO OAKES PRODUCTS CORPORATION, OF NORTH CHICAGO, ILLINOIS, A CORPORATION OF MICHIGAN

AUTOMOBILE LOCK

Application filed April 13, 1922. Serial No. 552,357.

This invention relates to certain improvements in automobile locks, and more particularly to locks of the type that are associated with the steering column of a motor driven vehicle to secure against rotation the post extending therethrough which connects with the steering wheel.

It is a primary object of my invention to provide a lock of simple, practical and efficient construction which may be contained within a housing that surrounds the steering column of an automobile, and, if desired, be secured to a fixed part thereof such as the dash board. Other objects as well will hereinafter appear from the description and claims to follow wherein this invention is represented as consisting of parts which are constructed and arranged in accordance with certain exemplifications shown in the accompanying drawings in the manner following:

Figure 1 is a fragmentary central longitudinal sectional view through the lock housing attached to a steering column and showing parts in ignition-on-position.

Figure 2 is a transverse sectional view taken on the line 2—2 of Figure 1 looking in the direction of the arrows.

Figure 3 is a sectional view taken upon the line 3—3 of Figure 2, but with parts shown in ignition-off-position and showing a modified form of attaching bracket.

Figure 4 is a part elevational and part sectional view somewhat similar to Figure 2 but showing the steering post in locked position with ignition off and illustrating a modified form of ignition switch.

Figure 5 is a transverse sectional view through a lock involving a modified form of the invention, showing the parts in position for locking the steering post.

Figure 6 is a side elevational view of the modified form of the invention shown in Figure 5 but showing the rock shaft in a different position.

Figure 7 is an enlarged sectional view taken upon the line 7—7 of Figure 5.

The lock shown in Figs. 1 and 2 is contained within a housing A adapted for mounting upon the column B which surrounds in spaced relation an automobile steering post C, here represented as a tube. In the region of the lock is a collar D secured fast to the post, there being a longitudinal groove 10 formed in the collar. Since the collar is associated with the post primarily to facilitate construction, and is to all intents and purposes a part thereof, it will be so treated in the description and claims to follow.

If the present lock be designed for additional connection to the automobile dash or instrument board E, it is preferably formed with an upwardly extending plate 11 serrated as at 12 or otherwise appropriately formed on its face which engages with the rear side of the dash. Connecting the lock to the board are bolts 13 each passing through an aperture in the dash and through a slot 14 in the plate for permitting the device to be vertically adjusted upon the dash board, thereby varying within certain limits the angular position of the steering column. A nut 15 threaded onto each bolt bears with pressure against the rear side of the plate which tends to remain in a given position of adjustment relative to the dash, due, in part, to the serrations 12.

A slightly different connection between the lock housing and dash board is illustrated in Fig. 3 wherein the plate 11 is provided additionally with a boss 16 adapted to extend into a slot 17 formed through the dash, thereby resisting any tendency toward lateral shifting movement. Bolts or screws 18 for providing additional connection may also be used, as indicated in this figure.

The mechanism contained within the housing by which the steering post may be locked against rotation comprises parts as follows: Within a chamber which extends rearwardly from the column is slidably mounted a locking bolt 20 having an open slot 21 at its rear end in which is seated a compression spring 22 that tends to urge the belt forward through an opening 23 in the column so as to lodge within the collar groove 10 for locking the steering post against rotation. Unless otherwise restrained, the locking bolt will, therefore, assume the position indicated by the dotted lines in Fig. 1. For controlling the movements of the locking bolt I provide in its body an aperture 24 the rear side of which is flat, and disposed therewithin is an eccentric 26 having two angularly related flat faces *a* and *b* and also a third flat face *c* which is aligned substantially diametrically with the axis of a rock shaft 30 on which the eccentric is formed. This rock shaft is journaled within an opening extending transversely through the housing rearwardly of the column, one end of the shaft being provided with an operating handle 31 which lies exteriorly of the lock.

Referring now to Figs. 2 and 3, there is arranged within the housing a rotatable cylinder lock 35 having an entry slit 36 disposed upon the upper side of the housing for the reception of an operating key. The lock cylinder extends within the housing close to the rock shaft, and at its inner end is provided with an eccentric lug 37 adapted when in one position to engage within one of three longitudinal grooves *x*, *y* and *z* that are formed in the rock shaft.

The opposed walls of the different grooves *x*, *y*, *z*, form locking shoulders. When the flat face C of shaft 30 is in contact with the outer wall of the slot 24 in the locking bolt 20, that is when the locking bolt is in locking position and engaging groove 10 in the steering post C, the groove *x* in rock shaft 30 will be in alinement with the lug 37 on the key cylinder so that by turning the key controlled cylinder 35, the lug 37 will engage the groove *x* and lock the shaft 30 against rotational movement as shown in Figure 4.

When the face *a* of shaft 30 engages the outer wall of slot 24 in the latch bolt 20 as shown in Figures 1 and 2, the groove *z* is in alinement with the locking lug 37. In this position, the steering post is unlocked and the ignition is on. By turning the key cylinder to move the lug 37 into groove *z*, the parts will be locked in such position.

When face *c* of the shaft 30 is in contact with the outer wall of the slot 24 in the latch bolt 20, the groove *y* will be in alinement with the lug 37 of the key cylinder as shown in Figure 3 and may be engaged therewith by rotating the key cylinder. In this position, the steering post is unlocked but the ignition is off. In the three different positions just described, the spring 22 acting upon the bolt 20 will tend to hold the shaft 30 in any of its three positions.

Extending transversely into the rock shaft is a bore 40 wherein is accommodated a push spring 41 that bears against a plunger 42 to press the same outwardly against the surrounding walls. The open end of the bore lies adjacent one end of the groove *z* and is disposed in the plane of an intersecting tangential bore 43 wherein is slidably mounted a safety pin 44 having a head 45 which projects exteriorly of the housing. A spring 46 which bears outwardly against the head tends to hold the safety pin in an outer position. In the body of the pin is provided a longitudinally curved notch 47, the contour of which about corresponds to the periphery of the rock shaft 30. When the safety pin is pushed in to its limit which may be determined by engagement of its inner end with the bottom 48 of the bore, the notch 47 will coincide with the periphery of the rock shaft; whereas in its normal position (see Fig. 3), the pin will engage the rock shaft in the region of the lower notch end.

Of more importance, however, is the relationship to the safety pin of the plunger 42 which engages therewith whenever the rock shaft is so disposed that either of the eccentric faces *a* or *b* are engaged by the bolt 20. From Fig. 3 it will be noted that the plunger end protrudes into the bore 43 so as to engage with the corner 49 which is formed by the intersection of the bore with the opening wherein is accommodated the rock shaft. The rock shaft will accordingly be prevented from rotation in a clockwise direction. If, however, the safety pin be shoved in, its curved notch surface 47 will act as a cam to force the plunger back to a position where it lies wholly within the rock shaft, thereby permitting the same to be rotated. In the position shown in Fig. 3, the rock shaft is also held by the eccentric lug of the cylinder lock from rotating in either direction.

To permit operation of the steering mechanism, the locking bolt is retracted, as indicated in Fig. 1, to what will be termed first position. Here it will be noted the eccentric face *a* is engaged with the locking bolt. Additionally I provide a stop means in the form of a pin 50 which engages with the handle 31 when the rock shaft has been rotated through its intended arc—about 180° altogether. In this first position the eccentric 37 may be moved into notch *z* to maintain the parts against change in relation. A second or intermediate position is reached when face *b* of the eccentric is presented to the locking bolt. In shifting to this position the plunger 42 comes into engagement with the corner 49 to prevent further movement without which the steering post cannot be locked. In the second position the eccentric lug 37 may also be relied upon to hold the parts immovable. The third position requires a rotation of the rock shaft from first position through about 180° to present the eccentric face *c* to the locking bolt which is then permitted to move forward into engagement with the groove 10 to lock the steering post. The plunger 42 in this position is wholly within the bore 40 so as to have no active function.

In connection with a steering lock of the kind described, an ignition switch may also be provided. Two suggested constructions are shown in Figs. 2 and 4. In the former a switch is provided at the end of the rock shaft opposite the operating handle 31, the whole being housed within a casing 55 that is removably secured to the lock housing.

As shown the switch comprises an eccentric tongue 56 mounted upon one end of the rock shaft between appropriate insulating disks 57. The tongue is adapted for movement between fingers 58 which are secured to an insulation block 59. Wires 60 and 61 connect with the fingers and form part of the engine ignition circuit which will be assumed to be a battery circuit. The tongue occupies a rotative position upon the rock shaft such as to lie between the fingers 58 only when the parts are in first position. In the second and third positions the tongue is disengaged from the fingers so as to break the ignition circuit. By combining a switch of this character with the steering lock of this invention, I provide for operation of the steering mechanism and ignition system when the parts are in first or running position; in the second position the ignition only is disabled; whereas in the third position both the steering and ignition are rendered inoperative.

An ignition switch of somewhat altered construction is shown in Fig. 4, wherein the lock housing is formed to provide a chamber for the accommodation of a slidable plunger 62ª of insulating material, a spring 62 pressing one of its ends against a ball 63 that rests upon the periphery of the rock shaft. A socket 64 formed in the shaft is adapted to partly receive the ball when the parts are in the first position, the ball, together with its associated parts, constituting in effect a frictional lock in relation to the rock shaft. Bearing laterally against the plunger are two pins 65 and 66 held in suitable insulating mountings 67, each being spring pressed against the plunger. Capping one end of the plunger is a conductor sleeve 68 that extends from the pin 65 close to the pin 66 which latter bears against the insulated body of the plunger when the parts are in the position shown in Fig. 4. The cap 66 may be suitably insulated from the casing, or the pin 65 may be used as the ground side of the circuit. If the rock shaft be rotated, however, to the second or third positions wherein the ball 63 is expelled from the socket 64 the plunger will shift endwise sufficiently to move the conductor sleeve out of contact with the proximate end of the pin 66, thereby breaking an electrical circuit between the two pins. Suitable insulated conductors, not shown, extend from the pins to provide an electrical circuit for the ignition system of the engine in a manner that is well understood.

In Figs. 5 to 7 inclusive, I have shown a construction which differs only in details from that set forth in the preceding description. In these figures, the lock housing 70, for manufacturing reasons, is provided with a removable collar 71 one end of which is formed with a tongue 72 adapted to hook in behind the rear side of a flange 73 which is extended from the housing. The opposite end of the collar may be made fast to the housing as through the medium of a screw bolt 74 having a countersunk head 75, as shown. The bolt is preferably disposed obliquely in relation to other parts contained within the housing so as to be more compactly accommodated therewithin.

The housing is formed to provide a chamber within which is slidably mounted a locking bolt 76 adapted to engage with a groove in the steering post, not shown. The locking bolt is urged to a forward position by means of a coiled spring 77, having a bearing against the head 78 of a plunger 79 which is urged toward the locking bolt by a spring 80. The plunger 79 forms part of a switch mechanism which will be presently described.

The means by which the locking bolt may be retracted follows in the main the construction elsewhere described in that use is made of a rock shaft 81 equipped with an operating handle 82, there being a stop pin 83 on the housing exterior adapted to engage with opposite ends of the handle to limit its movements through an arc of substantially 180°.

The rock shaft 81 in this modified form has a groove x adapted to be engaged by the lug 37 in the key cylinder when the steering post is locked as shown in Figure 5. However, instead of using a separate groove y and a separate groove z on rock shaft 81 as is shown in connection with rock shaft 30, this rock shaft 81 has combined the grooves y and z into a single large groove d as shown in Figure 5. The shoulder or wall e of the large or wide depression d will cooperate with the lug 37 to prevent oscillation or movement of the rock shaft to control member locking position. With this construction, rock shaft 81 may be freely moved from its third to its second position. In other words, the ignition can be readily turned on and off when the eccentric lug 37 on the key controlled cylinder 84 is in engagement with the large or double groove d. This cylinder 84 is also provided with a slit 85 for receiving a key for actuating the said cylinder whereby the rock shaft 81 may be immovably locked when the latch bolt 46 engages the steering post, and may be locked for limited movement between the second and third positions. In this modified form a safety pin 86 may be associated with the rock shaft as in the first form.

I have so arranged the screw bolt 74 and rock shaft 81 that the cylindrical apertures within which the same are received are intersected to a slight extent. In order that the bolt and shaft may each be accommodated in its respective aperture, the bolt is formed with an elongated annular groove 87 which lies adjacent the periphery of the rock shaft.

In the first form of the invention, the rock shaft or bolt 30 may be locked in control member locking position with the switch open, or in control member unlocking position with the switch closed or in an intermediate position with the switch open. In the second form of the invention, the rock shaft or hand bolt 81 may be locked against movement when the steering control member is locked, and may be locked with provision for limited movement to turn the ignition on or off when locked in control member unlocking position by means of the wide groove. In assembling the parts, the bolt is first set in place following which the rock shaft is moved to its position. The effect of this construction is to lock the bolt against removal, thereby rendering impossible the withdrawal of the collar 71 from the housing should this be desired for purposes of tampering with the lock. An ignition switch is also associated with the lock just described, this taking the form that is shown in Fig. 5. As shown, the switch includes in its assembly the plunger 79 of conducting material, its outer end being fitted with an insulating cap 90. Mounted to bear against different portions of the plunger are two pins 91 and 92 each connecting respectively with one of the wires of the ignition circuit, not shown, and suitably mounted so as to be insulated from each other and from the surrounding parts. In the position indicated in Fig. 5, the one pin 91 bears against the insulating cap 90 and hence is ineffective to establish a circuit through the plunger to the other pin. The rod 79 may be suitably insulated from the casing or the pin 92 may be used as the ground connection. If, however, the rock shaft 81 be so rotated as to retract the locking bolt from the steering post the plunger 79 will, through motion transmitted by the bolt, be shifted endwise to present a portion of its body against the pin 91, thereby completing the electrical circuit. The switch so constructed is preferably enclosed within a housing 93 removably secured to one end of the lock housing. In addition, I have shown a connection between the housing and the dash 94 consisting of a bracket plate 95, this being merely a suggestive means for the purpose.

The device forming the present invention provides a lock for the steering mechanism and, associated therewith, a lock for the ignition system of an automobile engine. In using the term "ignition system" I wish to be understood as referring to any electrically controlled automobile mechanism, the operation of which is necessary to free use of the car. Both locks in this invention are under the control of a single means. In addition, the switch which forms the ignition lock may be operated directly by the bolt which serves to lock the steering mechanism, or it may derive a circular movement directly from the steering lock control; or it may derive a linear movement from the steering lock control. In addition, the operation of the rock shaft is controlled by a key operated lock, and also by a safety pin which must be shifted as a step preliminary to rotation of the rock shaft from its locking positions. Features such as these which characterize my invention, are embodied in a structure which is practicable to manufacture and install, and which will be found durable in service.

I claim:

1. In a device of the kind described, a housing adapted for mounting upon the column surrounding an automobile steering shaft, a collar associated with the housing and adapted to clamp upon the column, means within the housing for locking the shaft against rotation, means for securing the collar to the housing, and rotatable controlling means for the shaft locking means adapted also in certain rotative positions only to lock the securing means immovably to the housing, substantially as described.

2. In a device of the kind described, a housing adapted for mounting upon the column surrounding an automobile steering shaft, means within the housing for locking the shaft against rotation, controlling means therefor including a rock shaft, a collar associated with the housing and adapted to clamp upon the column, and a bolt connection between the collar and housing adapted to lie within an aperture which intersects that wherein the rock shaft is journaled, the bolt being formed with an annular groove wherein the rock shaft is disposed such as to prevent withdrawal of the bolt except when the rock shaft is first removed, substantially as described.

3. A coincidental lock in which is combined a locking bolt, a switch having a part movable with the bolt to open or close an electrical circuit, tension means urging the movable switch part toward the bolt whereby the one may transmit motion to the other, and means for operating the bolt, substantially as described.

4. A coincidental lock in which is combined a reciprocable locking bolt, a switch having a part aligned with the bolt reciprocable therewith to open or close an electrical circuit, tension means urging the reciprocable switch part toward the bolt whereby the former is caused to follow the latter when the bolt is moved in one direction and when oppositely moved to transmit to the switch par a retractive movement, and means for operating the bolt, substantially as described.

5. In a device of the character described, a housing, a bolt movable within said housing, a member lying in the path of said bolt, means for yieldingly holding said bolt and said member separated, and a contact carried by said member adapted to open and close the ignition circuit.

6. In a steering post coincidental lock, a housing, a slidable bolt movable in said housing, a spring pressed member slidable in said housing in the same direction as said bolt, means for yieldingly holding said bolt and said member separated, and means in the path of said member for closing the ignition circuit as the bolt moves to unlocking position.

7. Mechanism for locking a control member and for operating the ignition switch of a motor vehicle, said mechanism comprising a bolt, a member movable to operate said bolt, said member being provided with shoulders, a handle on said member for manual operation, means to lock said member to prevent effective movement of said bolt thereby while permitting limited movement of said handle for switching the ignition alternately off and on, said means comprising key controlled locking means engageable with said shoulders.

8. Mechanism for locking a control member and for controlling the ignition of a motor vehicle, said mechanism comprising a bolt movable to alternately lock and release the control member, a switch, a member movable to move said bolt and to alternately open or close said switch, said member being provided with shoulders, means to lock said member against movement sufficient to move said bolt to locking position when said bolt is in release position while permitting movement of said member to alternately open and close said switch, said means comprising a member movable to engage said shoulders.

9. Mechanism for locking a control member and for controlling the ignition of a motor vehicle, said mechanism comprising a bolt movable to alternately lock and release the control member, a switch, a member movable to move said bolt to locking position and to open said switch, means to lock said member to retain said bolt in locking position, said member being movable to move said bolt to release position, and means to lock said bolt in release position while permitting movement of said member to alternately close and open said switch.

10. Mechanism for locking a control member and for controlling the ignition of a motor vehicle, said mechanism comprising a member movable to alternately effect locking and release of the control member, a switch operable by said movable member to alternately open and close the ignition, means to lock said movable member in control member locking position, and means to lock said movable member in control member release position while permitting limited movement of said movable member to alternately open and close said switch.

11. Mechanism for locking a control member and for controlling the ignition of a motor vehicle, said mechanism comprising a member movable to alternately effect locking and release of the control member, a switch operable by said movable member to alternately close and open the ignition, abutment members movable with said movable member, means to lock said movable member in control member locking position and to lock said movable member in control member release position while then permitting limited movement of said movable member to alternately open and close said switch, said means comprising key controlled locking means engageable with said abutment members.

12. Mechanism for locking a control member and the ignition of a motor vehicle, said mechanism comprising a member movable to alternately effect locking and release of the control member, a switch operable by said movable member to alternately open and close the ignition, means to lock said movable member in control member locking position and to thereby prevent the operation of said switch, and means to lock said movable member in control member release position while permitting limited movement of said member to alternately open and close said switch.

13. Mechanism for locking a control member and for operating a switch of a motor vehicle, said mechanism comprising a member movable to alternately effect locking and release of the control member, a switch operable by said movable member, said movable member having a locking shoulder and an unlocking shoulder, a key controlled device engageable with said shoulders, said member being movable to operate said switch when said key controlled device engages said unlocking shoulder.

14. Mechanism for locking a control member and for operating a switch of a motor vehicle, said mechanism comprising an oscillable member movable to alternately effect locking and release of the control member, a switch operable by said movable member, said movable member having a narrow locking depression and a relatively wide unlocking depression, and a key controlled device engageable within the depressions, said movable member being oscillable to alternately open and close said switch when said key operated device is engaged within the wide depression.

15. Mechanism for locking a control member and for controlling a switch of a motor vehicle, said mechanism comprising a bolt movable to alternately effect locking and release of the control member, a switch comprising a member connected to said bolt to maintain said switch in open position when the bolt is in locking position, said switch member being movable to alternately open and close said switch when said bolt is moved to release position, and means to lock said bolt in release position.

16. Mechanism for locking a control member and for controlling a switch of a motor vehicle, said mechanism comprising a bolt movable to alternately effect locking and release of the control member, a switch comprising a member connected to said bolt to maintain said switch in open position when said bolt is in locking position, said switch member being movable to alternately open and close said switch when said bolt is moved to release position, and means to lock said bolt in locking position and in release position, respectively.

ORVILLE S. HERSHEY.